Oct. 17, 1939.  P. B. SADTLER  2,176,152
EVAPORATOR
Filed March 2, 1938
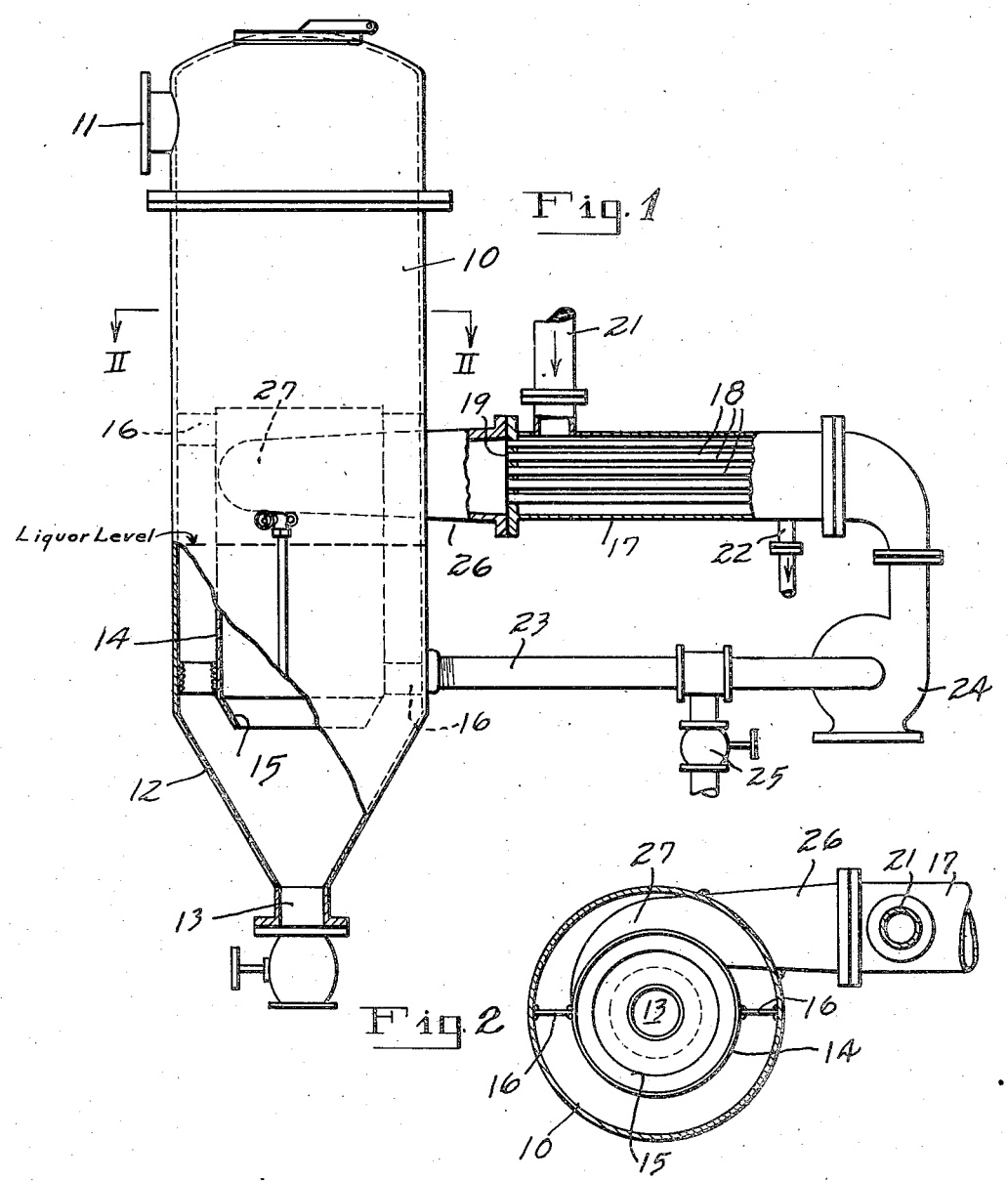
Inventor
PHILIP B. SADTLER
By
Johnston & Jennings
Attorneys Patented Oct. 17, 1939

2,176,152

UNITED STATES PATENT OFFICE 2,176,152

EVAPORATOR

Philip B. Sadtler, Birmingham, Ala., assignor to Goslin-Birmingham Manufacturing Company, Inc., a corporation of Alabama Application March 2, 1938, Serial No. 193,489

8 Claims. (Cl. 159—26)

This invention relates to evaporators, more particularly to evaporators of the forced circulation type, and has for its objects the provision of compact, simple apparatus of the character designated in which a more perfect separation of vapor and liquid may be obtained; the frictional resistance in the evaporator reduced; the salts or solids may be removed directly from the evaporating vessel; and the hydraulic head and power required diminished.

A further object of my invention is to provide a forced circulation evaporator including an evaporating vessel, an inner cylindrical chamber into which the heated liquid is discharged, and so arranged with respect to the evaporating vessel as to bring about a separation of the solids from the solution and their settling to the bottom of the evaporating vessel, from whence they are removed.

A still further object of my invention is to provide a forced circulation evaporator including a horizontal heating element through which liquid to be heated is forced at a high velocity and discharged tangentially with respect to the evaporating vessel, together with means in the evaporating vessel effective to bring about a separation of solids and liquids and protect the walls of the evaporating vessel from impingement of solids thereagainst.

Briefly, my invention comprises a cylindrical, vertically disposed evaporating vessel having a conical bottom for the collection of solids separated from the liquor being evaporated. The heating element is a horizontal cylindrical, preferably single pass, heater, through the tubes of which the liquor is forced at a high velocity by means of a centrifugal, or other suitable pump into the evaporating vessel. Instead of discharging directly into the evaporating vessel, it is a principal feature of my invention to provide a cylindrical member disposed concentrically within the evaporating vessel and supported from the walls thereof by any suitable means, into which the liquor is discharged tangentially and flows from the bottom of this cylindrical member into the evaporating vessel. The entrained solids move toward the central, quieter zone of movement in the cylindrical member. As the liquor leaves the bottom of the cylindrical member, it turns abruptly upward, leaving the solids which settle down into the conical bottom of the evaporating vessel. I am thus enabled to remove continuously the solids as they are formed in the liquor, without the necessity of a separate collecting vessel.

Apparatus embodying features of my invention is illustrated in the accompanying drawing forming a part of this application, in which Fig. 1 is a view in elevation, partly in section, of my improved evaporator; and Fig. 2 is a sectional view taken on the line II—II of Fig. 1.

Referring to the drawing for a better understanding of my invention, I show a cylindrical, vertically disposed evaporating vessel 10 having a vapor offtake connection 11 and a conical bottom 12. Solids separated from the liquor being evaporated may be discharged through a bottom, valved opening 13.

Disposed within the lower end of the evaporating vessel 10 is a cylindrical member 14, its upper end extending above the normal liquor level in the evaporating vessel and its lower end extending beneath the liquor level. The cylindrical member 14 is preferably concentrically supported from the walls of the evaporating vessel 10 by means of a plurality of radial supports 16 which may be welded or otherwise suitably secured to the evaporating vessel and to the cylindrical member. The lower end of the cylindrical member 14 may be provided with a constriction 15 for a purpose to be described more particularly hereinafter.

The heating element employed with my improved evaporator preferably comprises a cylindrical jacket 17 encasing a plurality of tubes 18 mounted in tube sheets 19 (only one of which is shown) in the usual manner. Steam for circulation around the tubes 18 and heating the liquor being evaporated is admitted into the jacket 17 through a conduit 21 at one end of the heating element and condensate is removed at the other end through a conduit 22. Liquor being evaporated is withdrawn from the evaporating vessel through a conduit 23 at a point above the level of the lower end of the cylindrical member 14 and passes to a centrifugal pump 24 from whence it is discharged at a high velocity into the tubes 18, where it is heated by the steam circulating around the said tubes. Liquor to be evaporated may be added by means of a valved conduit 25 connected to the suction line 23.

Instead of discharging the heated liquor directly into the evaporating vessel 10, it is discharged from the tubes 18 through a conduit 26 which passes through the outer wall of the evaporating vessel 10 and is connected at 27 tangentially to the cylindrical member 14 at a point above the normal liquor level in the evaporating vessel. This liquor, being discharged at a high velocity, assumes a vortex whirl in the cylindrical member 14, bringing about a separation of the solids in the liquor and as the liquor passes downwardly through said cylindrical vessel and turns abruptly upward to seek its level, the entrained solids settle down into the conical bottom 12 of the evaporating vessel. The constriction 15 aids in increasing the velocity of the discharged liquor from the bottom of the cylindrical member and thus aids in the separation of the solids.

The horizontal tubular heating element being disposed at a level with the point of discharge of the liquor therefrom reduces the friction head to be overcome by the pump 24 to a minimum and thus reduces to a minimum the power required to effect a forced circulation of the liquor through the tubes 18, bringing about the highest efficiency in heat transfer with a minimum expenditure of power. It will be apparent that the heating of the liquor may be accomplished in more than one stage, or pass, and that heating elements of other well known design may be employed and still accomplish the purposes of my invention, the embodiment herein illustrated being that which I prefer to employ. It will also be apparent that I have devised an improved evaporator embodying a maximum of simplicity of design, together with a maximum of efficiency of operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a forced circulation evaporator, an evaporating vessel, a cylindrical member open at the ends disposed within the evaporating vessel, a heating element, and means to discharge heated liquor from the heating element tangentially into the cylindrical member below the upper end thereof and above the liquor level in the evaporating vessel.

2. In a forced circulation evaporator, an evaporating vessel, a cylindrical member open at the ends disposed within the evaporating vessel, a heating element, means to discharge heated liquor from the heating element tangentially into the cylindrical member below the upper end thereof and above the normal liquor level in the evaporating vessel, and means in the vessel below the cylindrical member to collect solids separated from the liquor.

3. In a forced circulation evaporator, a vertically disposed cylindrical evaporating vessel, a cylindrical member disposed concentrically within the lower part of the evaporating vessel, a heating element, means to effect a forced circulation of liquor from the evaporating vessel through the heating element, and means to discharge liquor from the heating element tangentially into the cylindrical member below the upper end thereof and above the normal liquor level in the evaporating vessel to effect a separation of solids from the liquor.

4. In a forced circulation evaporator, a vertically disposed cylindrical evaporating vessel, a cylindrical member disposed concentrically within the lower part of the evaporating vessel, a heating element, means to effect a forced high velocity circulation of liquor from the evaporating vessel through the heating element, means to discharge liquor from the heating element tangentially into the cylindrical member below the upper end thereof and above the normal liquor level in the evaporating vessel, and means to withdraw liquor from the evaporating vessel for reheating from a point above the level of the bottom of the cylindrical member.

5. In a forced circulation evaporator, a vertically disposed cylindrical evaporating vessel, a conical bottom for the evaporating vessel for the discharge of solids, a cylindrical member concentrically disposed within the evaporating vessel immediately above the conical bottom, a horizontal tubular heating element, pump means to circulate liquor at high velocity through the heating element, and means to discharge heated liquor tangentially below the upper end of the cylindrical member and above the liquor level in the evaporating vessel.

6. In a forced circulation evaporator, a vertically disposed cylindrical evaporating vessel, a conical bottom for the evaporating vessel for the collection of solids, a cylindrical member concentrically disposed within the evaporating vessel immediately above the conical bottom, a horizontal tubular heating element, pump means to circulate liquor at high velocity through the heating element, means to discharge heated liquor tangentially into the upper portion of the cylindrical member below the upper opening thereof and above the liquor level in the evaporating vessel, and a constricted discharge opening at the bottom of the cylindrical member to increase the velocity of the liquor discharged therefrom into the evaporating vessel.

7. In a forced circulation evaporator, a vertically disposed cylindrical evaporating vessel, a conical bottom for the evaporating vessel for the discharge of solids, a cylindrical member concentrically disposed within the evaporating vessel immediately above the conical bottom, a horizontal tubular heating element, means to circulate liquor at high velocity through the heating element, pump means to discharge heated liquor tangentially into the upper portion of the cylindrical member below the upper opening thereof and above the level of liquor in the evaporating vessel, a constricted discharge opening at the bottom of the cylindrical member to increase the velocity of the liquid discharged therefrom into the evaporating vessel, and means to withdraw liquor from the evaporating vessel for recirculation at a point above the discharge opening of the cylindrical member.

8. In an evaporator, an evaporating vessel, a forced circulation heating element, an open ended cylinder disposed concentrically within the evaporating vessel with its upper end extending above the normal level of liquor within the evaporator and its lower end extending beneath said level, means to discharge liquor from the heating element tangentially into the cylinder above the normal liquor level and below the upper end of the cylinder, means to withdraw liquor from the evaporating vessel for recirculation from a point above the level of the lower end of the cylinder, and means to remove solids from the lower end of the evaporating vessel.

PHILIP B. SADTLER.